United States Patent
Scholz

(10) Patent No.: US 6,796,582 B2
(45) Date of Patent: Sep. 28, 2004

(54) ASSEMBLY CONSISTING OF AN INFLATOR, A HOUSING AND A RETAINER

(75) Inventor: Markus Scholz, Waldenbuch (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/195,658

(22) Filed: Jul. 15, 2002

(65) Prior Publication Data

US 2003/0020267 A1 Jan. 30, 2003

(30) Foreign Application Priority Data

Jul. 26, 2001 (DE) .................................... 201 12 313 U

(51) Int. Cl.[7] .............................................. B60R 21/28
(52) U.S. Cl. ..................................................... 280/741
(58) Field of Search ............................... 280/740–742, 280/728.1

(56) References Cited

U.S. PATENT DOCUMENTS

| | | | |
|---|---|---|---|
| 4,394,033 A | * | 7/1983 | Goetz et al. ................ 280/736 |
| 5,456,489 A | | 10/1995 | Rose et al. |
| 5,511,819 A | | 4/1996 | Spilker |
| 5,934,705 A | * | 8/1999 | Siddiqui et al. ............ 280/736 |
| 5,951,042 A | * | 9/1999 | O'Loughlin et al. ........ 280/741 |
| 6,000,718 A | * | 12/1999 | Krupp ........................ 280/736 |
| 6,095,559 A | * | 8/2000 | Smith et al. ................ 280/741 |

FOREIGN PATENT DOCUMENTS

| | | |
|---|---|---|
| DE | 4228232 C2 | 9/1995 |
| DE | 19533707 A1 | 3/1996 |
| DE | 29604345 U1 | 8/1996 |
| DE | 19616940 C1 | 7/1997 |

* cited by examiner

*Primary Examiner*—Thomas Price
(74) *Attorney, Agent, or Firm*—Tarolli, Sundheim, Covell & Tummino L.L.P.

(57) ABSTRACT

An assembly consisting of a cylindrical inflator, a housing and a retainer by means of which the inflator can be fixed in the housing. The inflator has a longitudinal centerline and a cirumferential surface area and the retainer comprises a circular opening with an edge. Protruding from the edge into the opening are tabs which engage the circumferential surface area of the inflator to fix the latter in the opening.

5 Claims, 7 Drawing Sheets

ASSEMBLY CONSISTING OF AN INFLATOR, A HOUSING AND A RETAINER

TECHNICAL FIELD

The invention relates to an assembly consisting of a cylindrical inflator, a housing and a retainer by means of which the inflator can be fixed in the housing, the inflator featuring a longitudinal centerline L and a circumferential surface area.

BACKGROUND OF THE INVENTION

Described in DE 296 04 345 U1 is one such assembly in which the inflator is fixed at its end by the retainer in the housing. The shape of the retainer is specially adapted to the shape of the inflator head for reliable retention thereof. This means that when another inflator is employed the retainer need to be readapted. Apart from this, minor tolerances may result in play occurring between the retainer and the inflator, thus resulting in the inflator no longer being securely fixed in the housing.

It is the object of the invention to provide an assembly of the aforementioned kind permitting simple and universal means of locating the inflator in the housing.

BRIEF SUMMARY OF THE INVENTION

According to the invention, an assembly consists of a cylindrical inflator, a housing and a retainer by means of which the inflator can be fixed in the housing. The inflator has a longitudinal centerline and a circumferential surface area and the retainer comprises a circular opening with an edge. Protruding from the edge into the opening are tabs which engage the circumferential surface area of the inflator to fix the latter in the opening. The inflator can be inserted through the opening in the retainer, it being clamped in place between the tabs to thus centering the inflator in the housing whilst preventing it from being radially displaced as well as rotationally displaced about its longitudinal centerline.

Further advantageous embodiments of the invention will be apparent from the sub-claims.

DETAILED DESCRIPTION OF THE PREFERRED EMBODIMENTS

Figure 1:
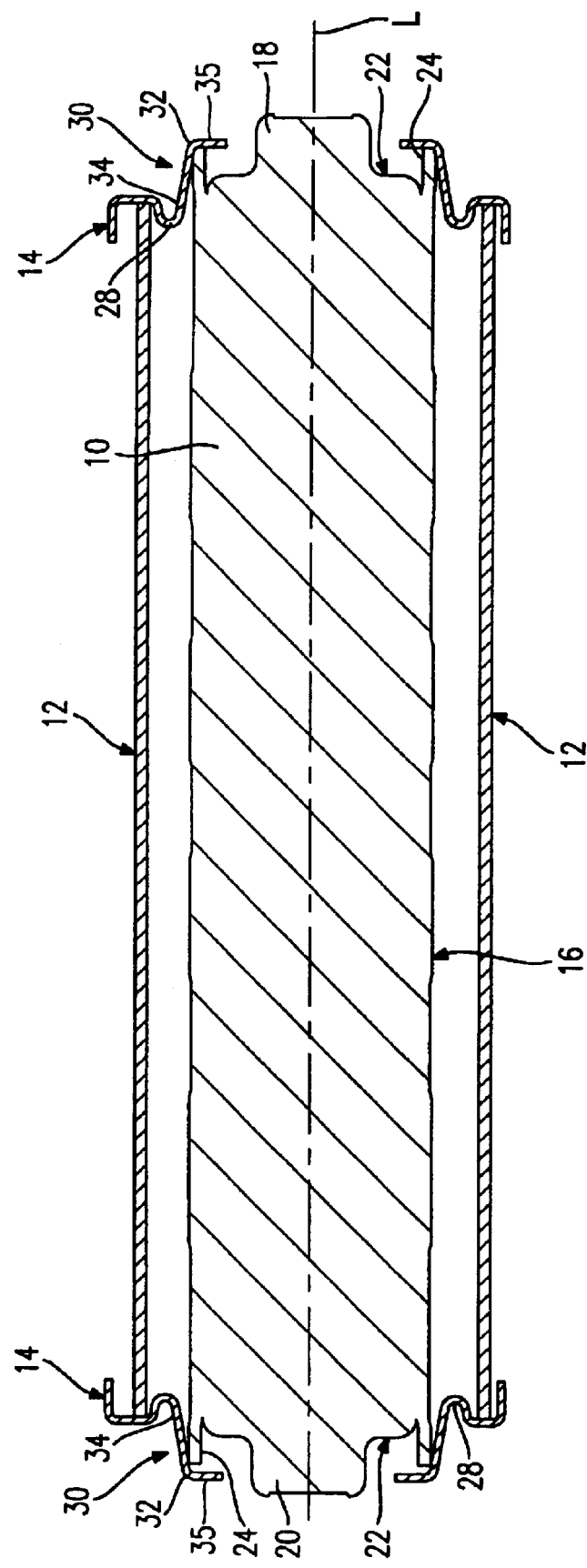
FIG. 1 is a longitudinal section through a first embodiment of the assembly in accordance with the invention.

Referring now to FIG. 1 there is illustrated a cross-sectional view through an assembly in accordance with the invention, consisting of an inflator 10, a housing 12 and two retainers 14. The inflator 10 is a conventional cylindrical tubular inflator having a longitudinal centerline L and a shell forming a circumferential surface area 16. The inflator 10 has a first end 18 and a second end 20, each of which is closed off by an end face 22. The shell of the inflator 10 protrudes by its ends 18 and 20 beyond the end face 22 and forms a rim 24 in each case.

Figure 2:
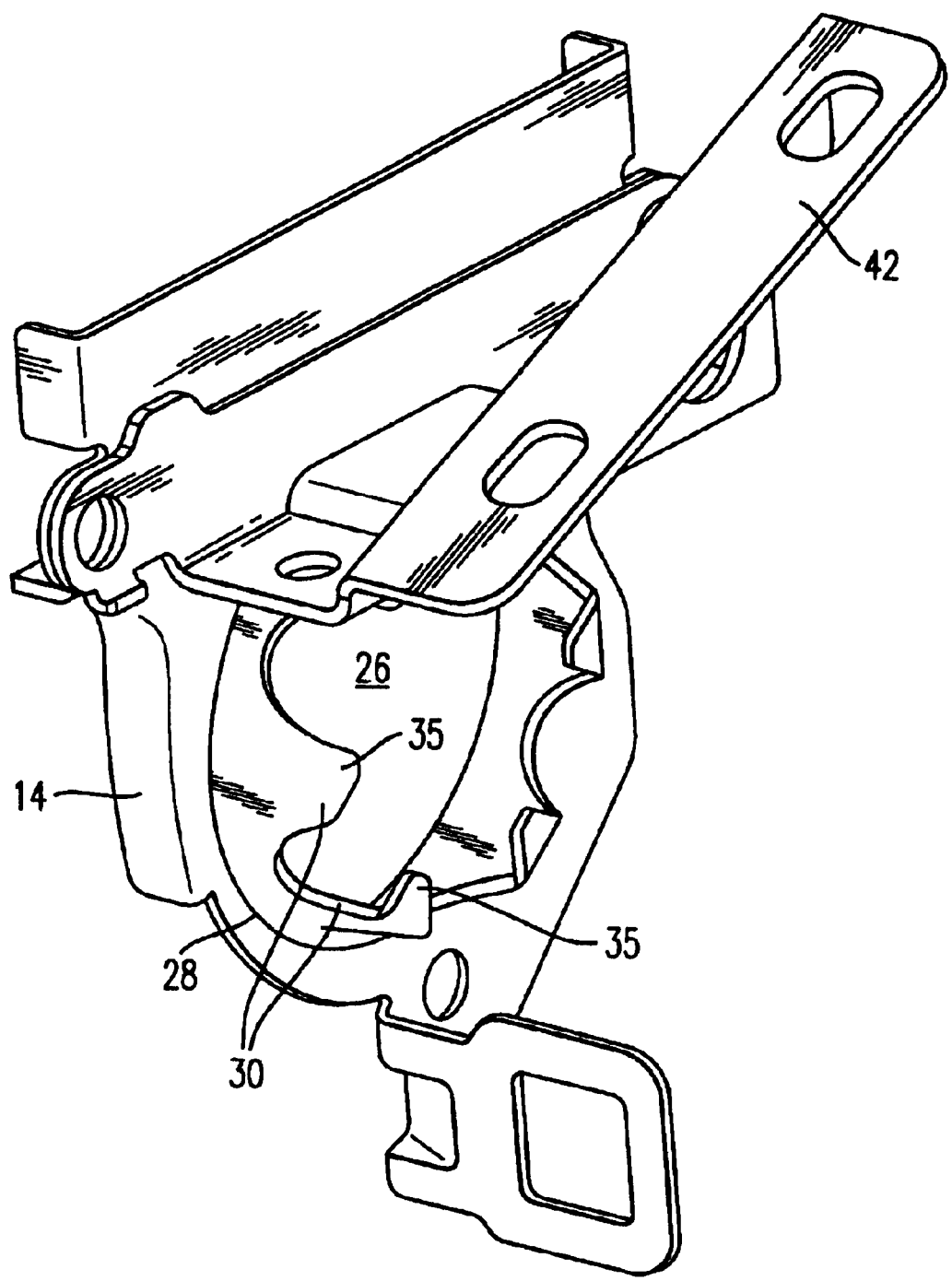
FIG. 2 is a view in perspective of the retainer of the assembly as shown in FIG. 1.
Figure 4:
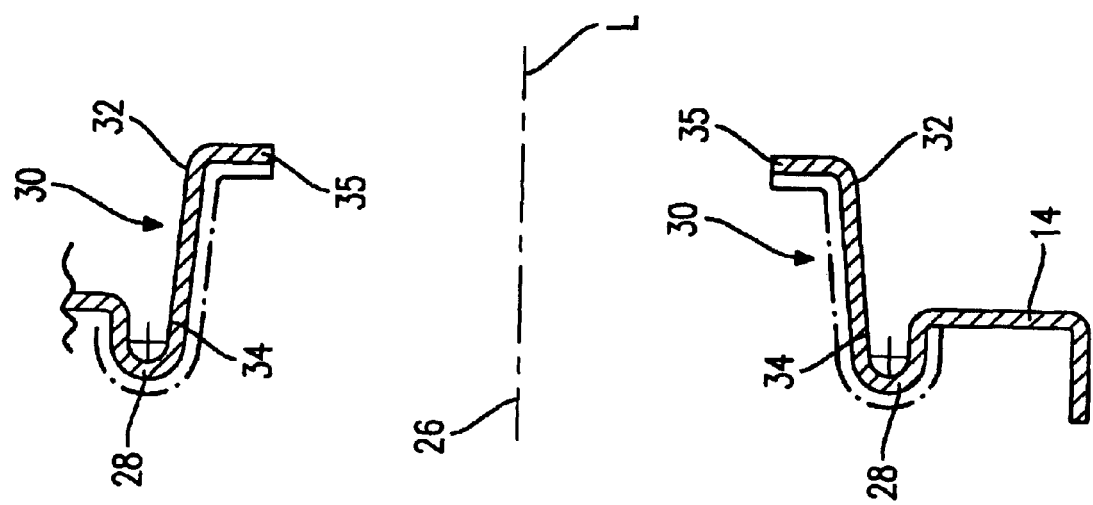
FIG. 4 is a cross-sectional view through the retainer as shown in FIG. 3 taken along the line IV—IV therein.
Figure 3:
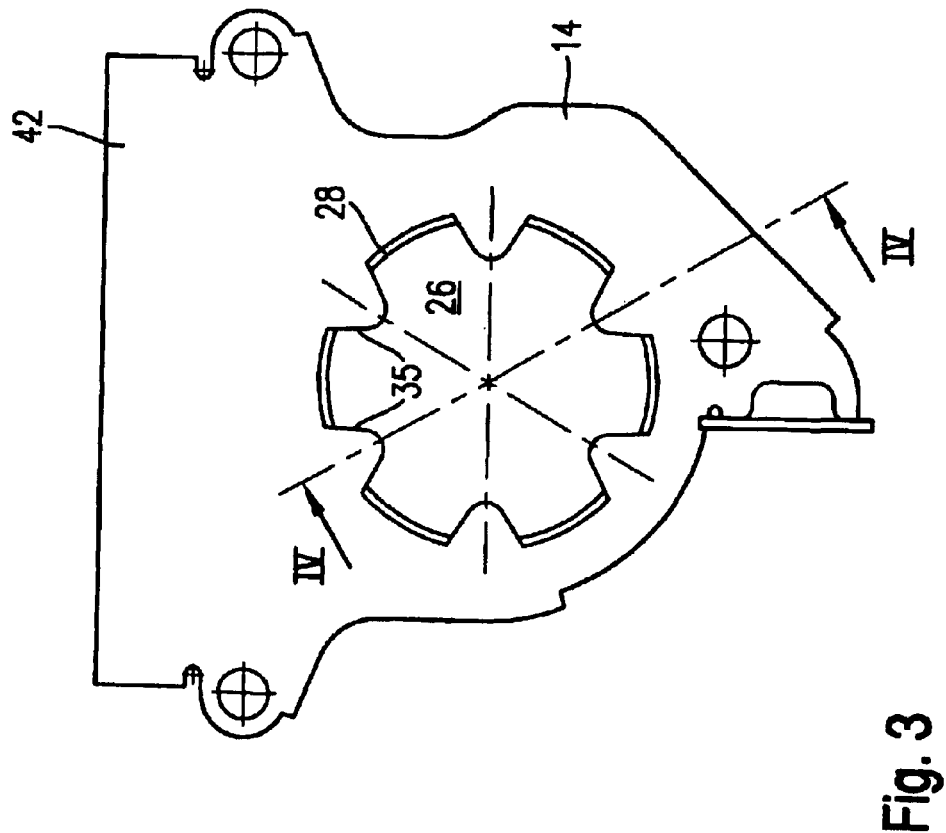
FIG. 3 is a front view of the retainer as shown in FIG. 2.
Figure 6:
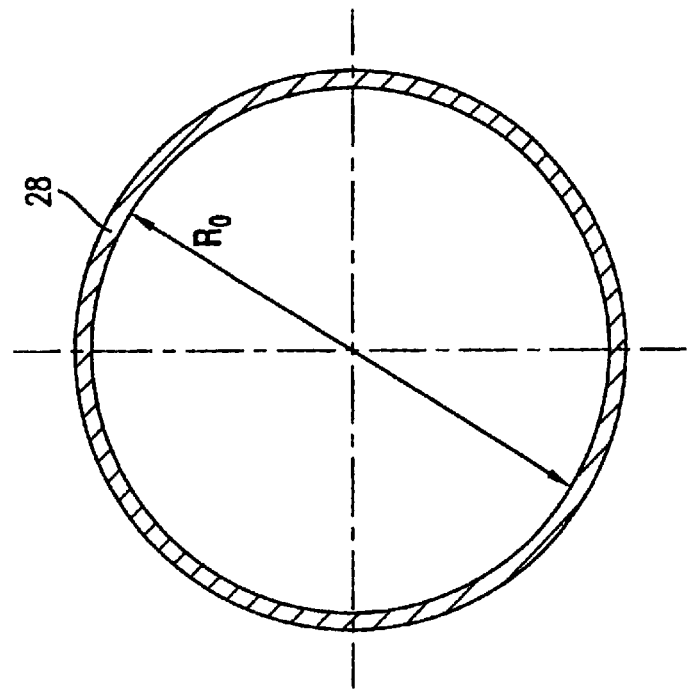
FIG. 6 is a cross-sectional view through the retainer as shown in FIG. 2 taken along the line IV—IV as shown in FIG. 5.
Figure 5:
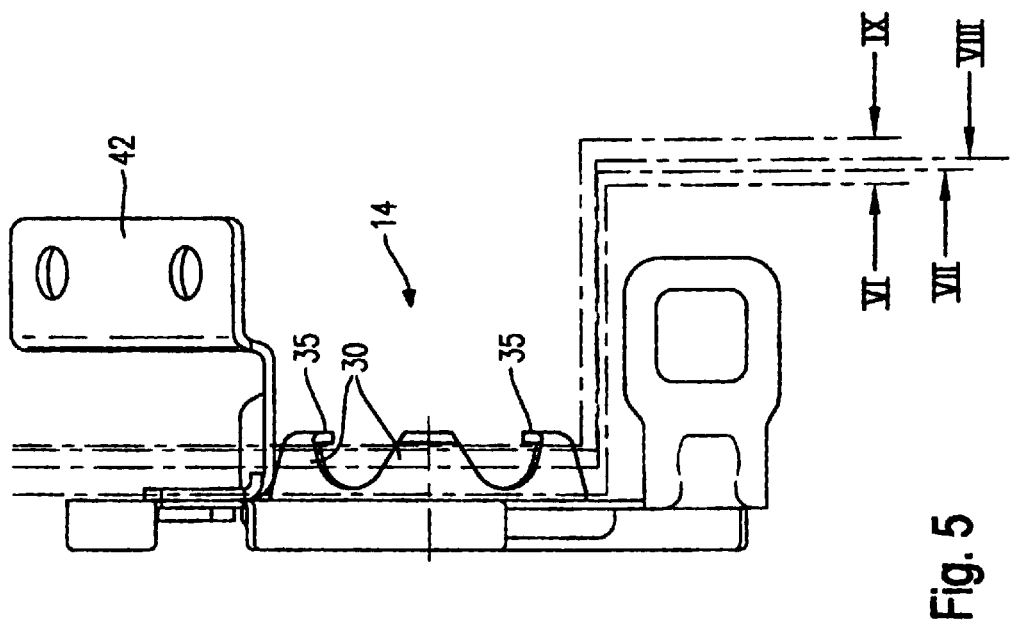
FIG. 5 is a side view of the retainer as shown in FIG. 2.

The two retainers 14 are configured mirror-inverse and close off the housing 12 at the end faces. One of the retainers is illustrated in FIG. 2 in perspective by way of example. The retainer 14 which may be produced, for example, as a stamped part of sheet steel comprises a circular opening 26, the radius $R_0$ of which is larger than the radius of the circumferential surface area 16 of the inflator 10. The opening 26 is defined by an edge 28 configured beaded for stiffening. Extending into the opening 26 from the edge 28 are tabs 30 having a free end 32 and a base 34 by which they adjoin the edge 28. The tabs 30 are wider at the base 34 than at their free end 32. Their free end 32 is bent towards the longitudinal centerline L and forms a retaining lug 35. Between their base 34 and their free end 32 the tabs 30 are inclined towards the longitudinal centerline L. Thereby, the tabs 30 define a circle 36 of the opening, the radius R of which reduces towards the free end 32 (see FIGS. 6 to 10). In this arrangement the largest radius $R_0$ of the opening circle 36 (FIG. 6) is larger than the radius of the circumferential surface area 16 of the inflator, whilst the smallest radius $R_4$ is smaller than the radius of the circumferential surface area 16 (FIG. 10). This is why the tabs 30 at the first end 18 and second end 20, respectively, the latter protruding through the opening 26 of the retainer 14, engage the rim 24 of the inflator 10.

In fitting the assembly the retainers 14 can be simply mounted by pushing the opening 26 onto the ends 18 and 20 of the inflator 10 in the housing 12. In so doing, the tabs 30 inclined towards the longitudinal centerline L are elastically and plastically deformed, resulting in the inflator 10 being clamped in place at its rim 24 by the tabs 30 so that it is, on the one hand, centered in the housing 12 and, on the other, locked in place to prevent it turning about its longitudinal centerline L. In addition, the retaining lugs 35 prevent any fore-and-aft displacement of the inflator 10 in the direction of its longitudinal centerline L.

The retainers 14 are additionally provided with fastener brackets 42 for securing the assembly in the vehicle.

Figure 8:
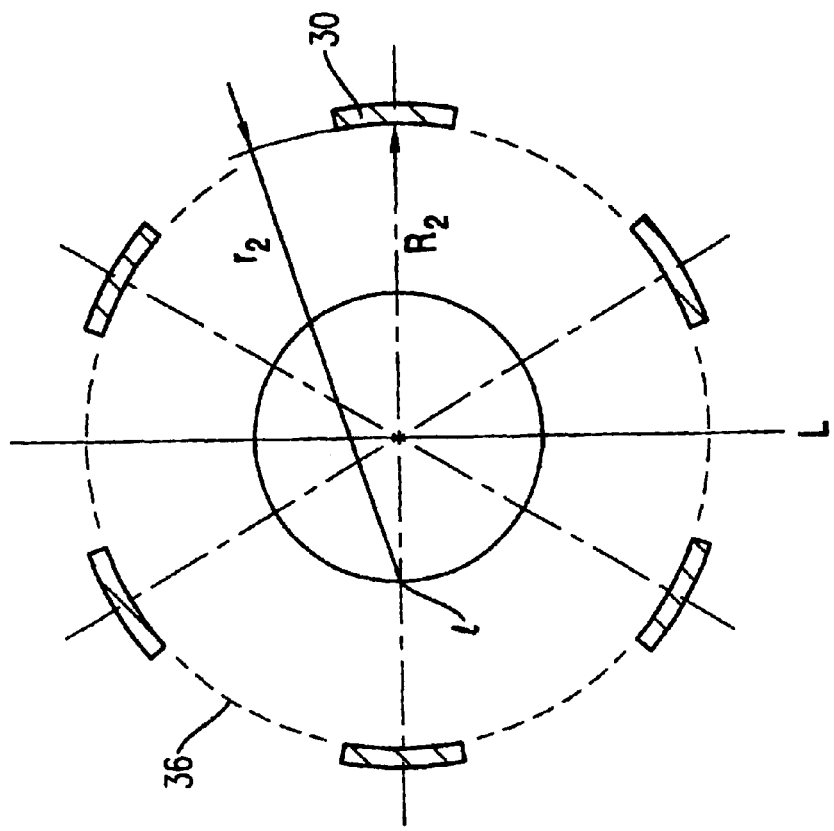
FIG. 8 is a cross-sectional view through the retainer as shown in FIG. 2 taken along the line VIII—VIII.
Figure 7:
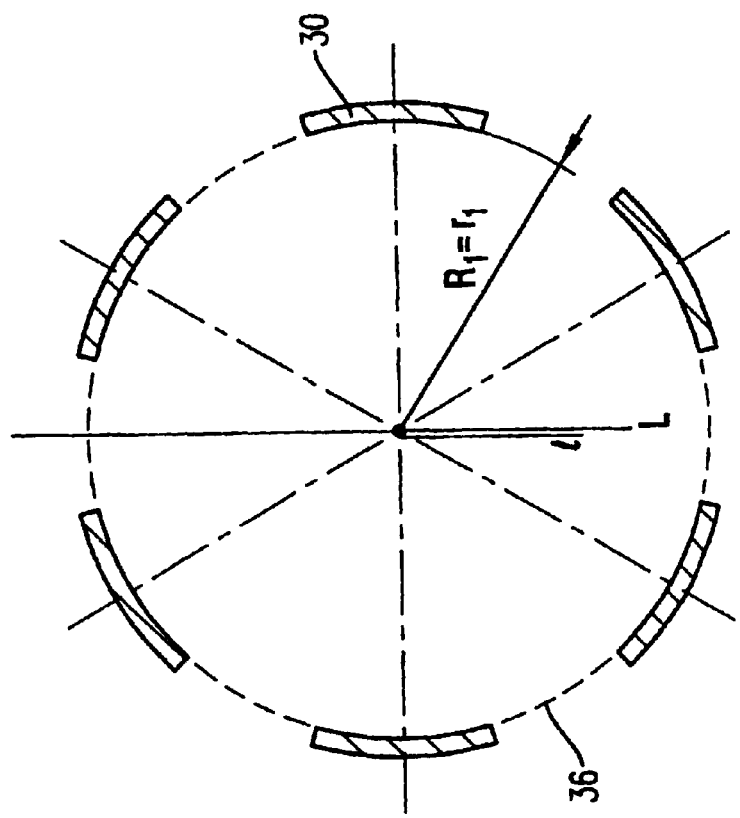
FIG. 7 is a cross-sectional view through the retainer as shown in FIG. 2 taken along the line VII—VII.
Figure 9:
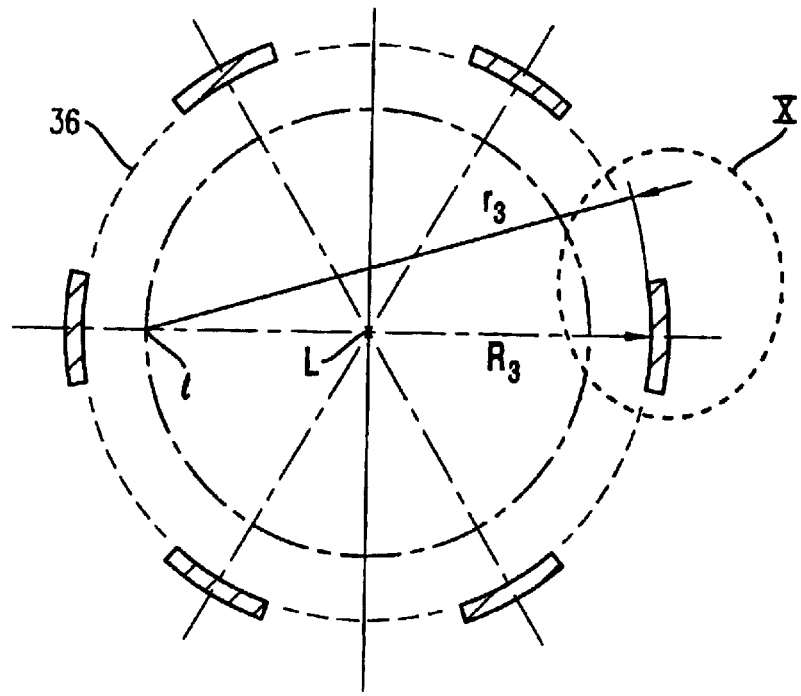
FIG. 9 is a cross-sectional view through the retainer as shown in FIG. 2 taken along the line IX—IX.
Figure 10:
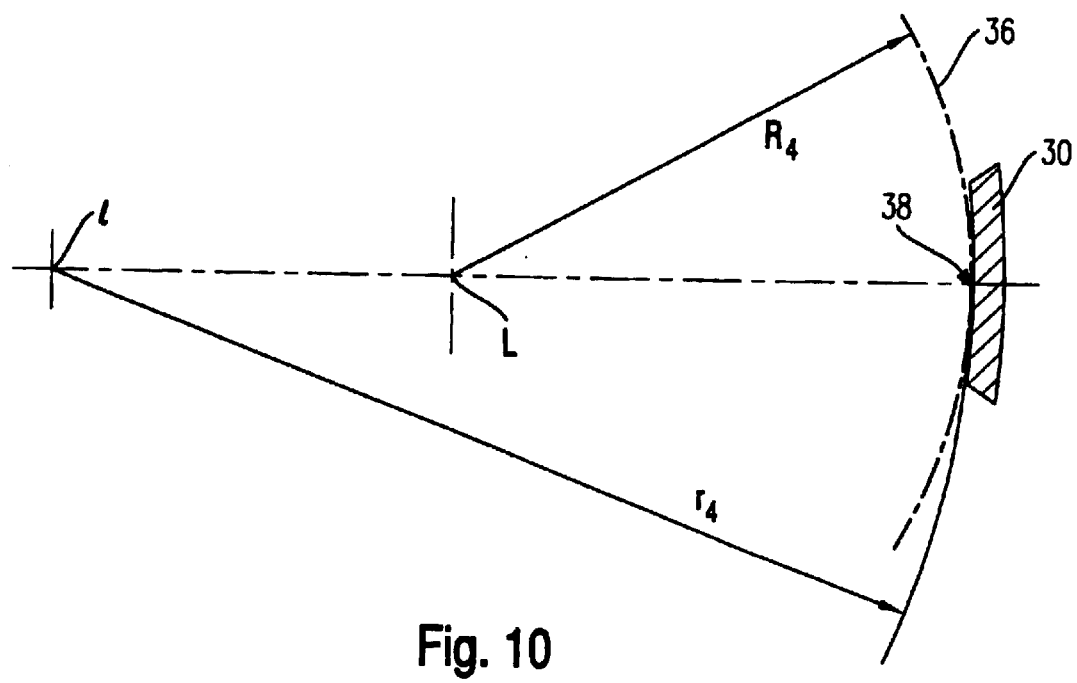
FIG. 10 is a cross-sectional view on a magnified scale of the portion X as shown in FIG. 9.

Referring now to FIGS. 7 to 10 there is illustrated how the tabs 30 are curved, i.e. about an axis 1 which with the longitudinal centerline L includes an angle other than 0°. In this arrangement, the radius of curvature r of the tabs 30 increases towards the free end 32 so that the axis 1 is displaced. At the base 34 the radius of curvature $r_1$ roughly corresponds to the radius $R_1$ of the opening circle 36 defined by the tabs, so that the axis 1 coincides with the longitudinal centerline L of the inflator 10 (FIG. 7), whereas at the free end 32 the radius of curvature $r_4$ is significantly larger than the radius $R_4$ of the opening circle 36 (FIG. 10). This results in the contact surface area 38 between the tabs 30 and the rim 24 not being fixed at the edge of the tabs 30 but in the middle thereof. This produces less surface pressure in the region of the contact surface area 38 to thus prevent chipping of the rim 24 by the bite of the edge of the tabs 30. The axes 1 of the various tabs define together a "quasi cone" about the longitudinal centerline L. The vertex of this cone lies roughly in the plane of the section as shown in FIG. 7 on the axis L. In the plane of the section as shown in FIG. 8, the cone has a diameter (indicated dot-dashed) which is defined by the spacing of the axis 1 from the longitudinal centerline L. In the plane of the section as shown in FIG. 9, the diameter of the cone is even larger than in the section plane as shown in FIG. 8.

Figure 11:
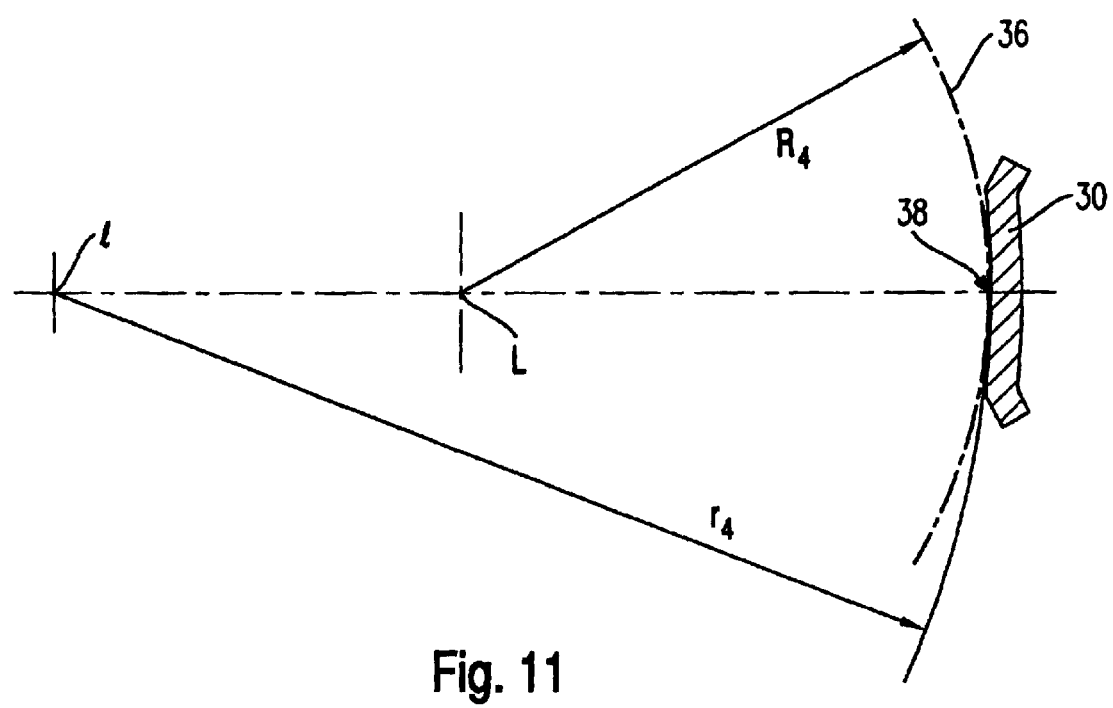
FIG. 11 is a cross-sectional view through a tab of a retainer in accordance with a second embodiment of the invention.

Another possibility of preventing the tabs 30 from biting into the rim 24 of the inflator 10 is illustrated in FIG. 11. In this case the tabs 30 are bent at their edge.

Due to the tabs 30 protruding into the opening 26 being plastically and elastically deformable, the retainer 14 permits good compensation of tolerances in inflators differing in radius. A further advantage materializes from the inflator being prevented from turning out of place about its longitudinal centerline L without this necessitating an additional element for positional fixing, for example, a nose engaging a groove in the inflator, thus enabling the inflator 10 to still be angularly positioned even during installation. The retainers can also be used to advantage for assemblies including inflators differing in length.

What is claimed is:

1. An assembly comprising: a cylindrical inflator, a housing and a retainer fixing said inflator in said housing, said inflator featuring a longitudinal centerline and a circumferential surface area and said retainer comprising a circular opening with an edge, tabs protruding from said edge into said opening which engage said circumferential surface area of said inflator to fix the latter in said opening.

2. The assembly as set forth in claim 1, wherein said tabs are curved about an axis which is parallel to said longitudinal centerline.

3. The assembly as set forth in claim 2, wherein said tabs comprise a free end and a base at which they are connected to said edge of said opening, and wherein a radius of curvature of said tabs in the region of said base substantially corresponds to a radius of said circumferential surface area of said inflator.

4. The assembly as set forth in claim 3, wherein said radius of curvature of said tabs increases towards said free end.

5. The assembly as set forth in claim 3, wherein said free end of said tabs is bent towards said longitudinal centerline.

* * * * *